UNITED STATES PATENT OFFICE.

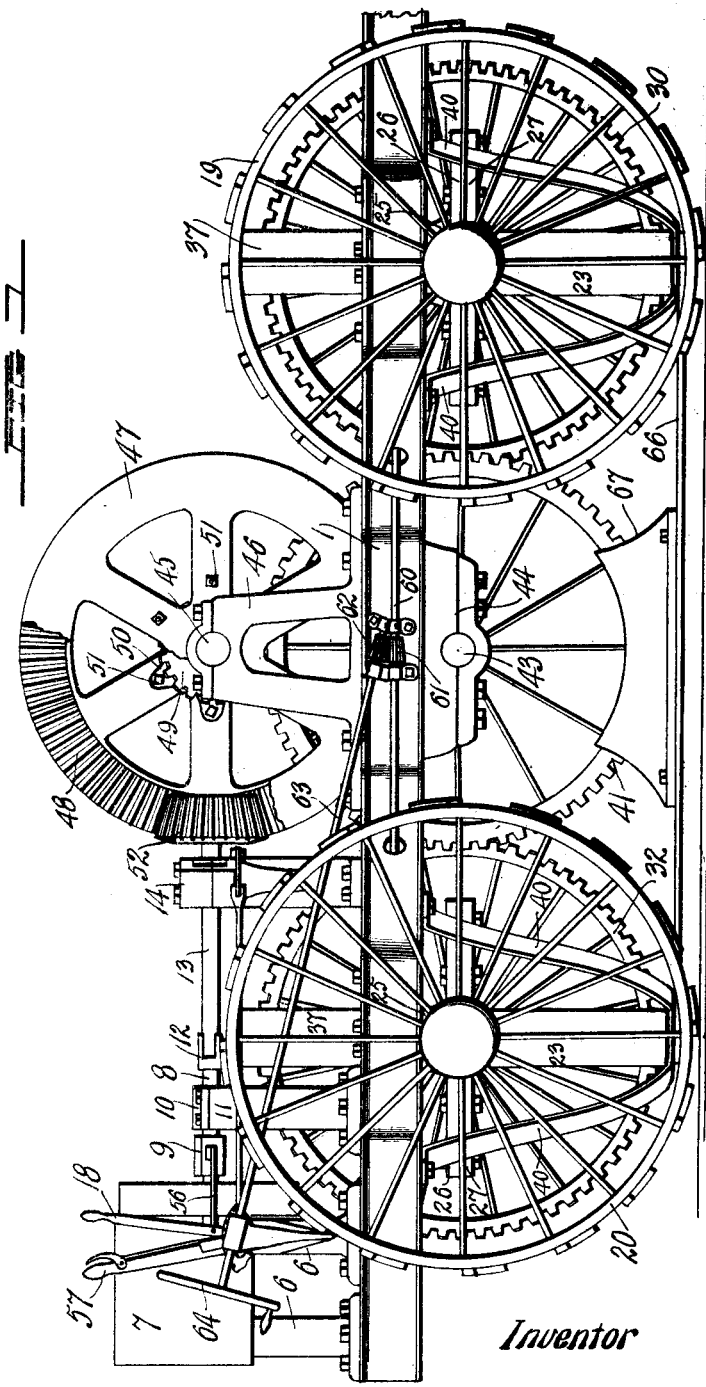

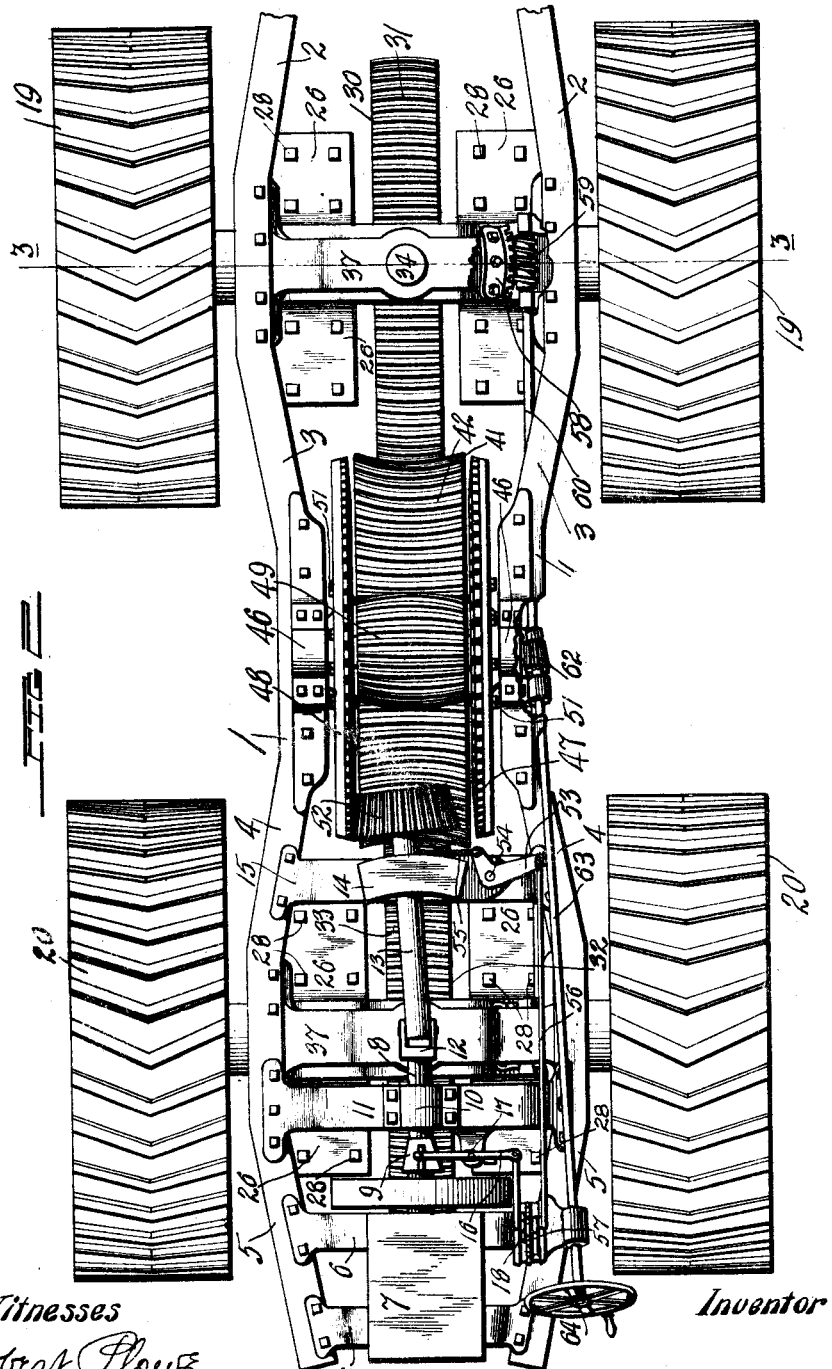

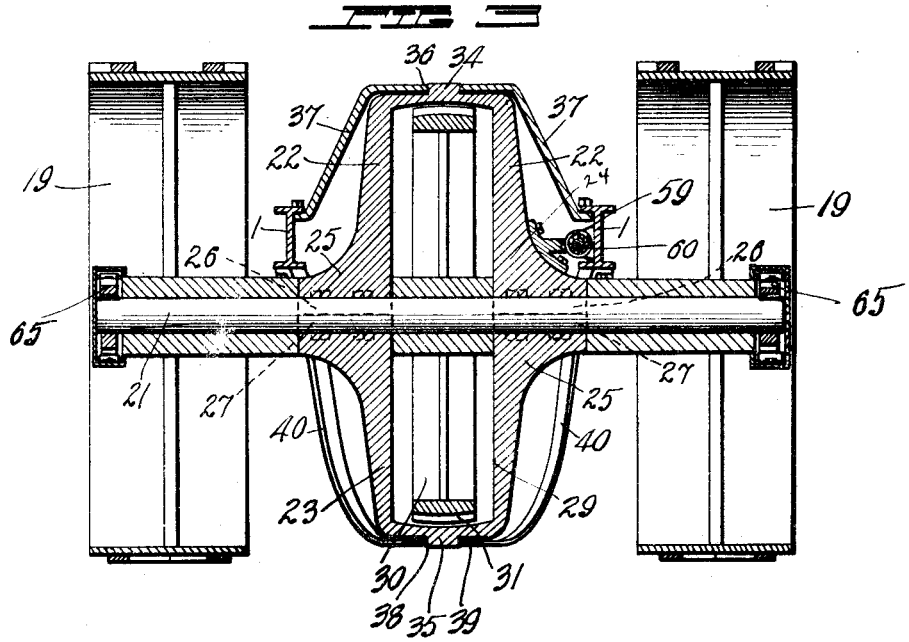

EDMOND BELLEMARE, OF PEORIA, ILLINOIS.

TRACTOR.

1,078,820.   Specification of Letters Patent.   Patented Nov. 18, 1913.

Application filed September 19, 1910. Serial No. 582,756.

*To all whom it may concern:*

Be it known that I, EDMOND BELLEMARE, a citizen of the Dominion of Canada, residing at Peoria, in the county of Peoria and State of Illinois, have invented certain new and useful Improvements in Tractors, of which the following is a specification.

This invention has reference to tractors and similar motor-vehicles.

One of the objects of the present invention is to construct a tractor or similar motor-vehicle where all four traction-wheels are used as drivers and the invention further relates to the transmission employed for imparting movement to all of said drivers.

A further object of the invention is to construct a tractor or similar motor-vehicle where all four traction-wheels are used as drivers; said drivers connected with oscillatory or pivoted axles, and means for oscillating said axles, whereby the front and rear traction-wheels will track in turning.

The invention has for a further object a tractor, the front and rear axles of which are capable of being oscillated to cause the wheels to track in turning, and the invention further relates to wheel plates carried by said axles, said wheel plates serving as pivots on which the axles may be turned, and also as a supporting means for the entire frame work and mechanism of the vehicle.

Figure 1 is a side elevation showing my improved tractor, parts being broken away; Fig. 2 is a plan of the tractor, with parts broken away; and Fig. 3 is a cross section as the same would appear if taken on the line 3—3 of Fig. 2.

Like characters of reference indicate corresponding parts throughout the figures.

The frame of the tractor comprises the two longitudinal frames or I beams 1, preferably irregular in outline or of sinuous formation, so as to provide the forward oppositely converging side portions 2 and 3, and the rearward oppositely converging side portions 4 and 5. Such forward and rearward oppositely converging side portions 2, 3, 4 and 5 of the beams present inclined or bevel faces corresponding to the angles the driving wheels will assume when the tractor is being turned and to adapt the forward and rear driving wheels to turn without interfering with said I beams.

The I beams 1 may be tied at their forward and rear ends in any suitable manner, such for instance by tie-plates 6—6 as shown in Fig. 2, which in this instance also serve as a support for any suitable type of engine 7 having a drive shaft 8 on which is carried a suitable friction clutch 9 employed for intermittently connecting said shaft with the engine. The forward portion of shaft 8 is carried through and has a bearing in a boxing 10 mounted on a brace 11 connected or attached to the beams 1. The forward end of shaft 8 has a knuckle joint 12 with which is connected a shaft extension 13, and said extension 13 passes through and is adapted to oscillate in a guide 14 mounted on a brace 15 connected or attached to the beams 1. With the exception of the shaft extension 13 no great stress is laid on the type of engine 7, or its friction clutch 9, as any mechanism suitable for the purposes herein intended may be employed. The friction clutch 9 is thrown into or out of gear by a lever 16 fulcrumed at 17 and said lever is arranged to be operated by the hand lever 18.

19 and 20 designate the front and rear traction-wheels, all of which are intended as drivers. The wheels 19 and 20 are carried on similar axles 21, see Fig. 3. The beams 1 are disposed above the axles 21 and in this position are best arranged to support the operating parts for turning the axles 21.

22 and 23 designate upper and lower wheel plates, respectively. Said plates are carried on the shafts 21 between the traction-wheels 19 and 20, as shown in Fig. 3, and are provided with half boxings 24 and 25 which embrace the axles and also laterally extended bearing plates 26 and 27, see Figs. 1 and 2, which are bolted together at 28, or otherwise suitably united. Said plates 22 and 23 are further provided with spaced legs 29, forming the body of the plates, and between which, on the front axle 21 is disposed a gear wheel 30, having preferably a convex toothed periphery 31; while on the rear axle and between the legs of the plates 22 and 23 is disposed a gear wheel 32, having preferably a convex toothed periphery 33. The wheels 30 and 32 are in all respects similar and form a part of the transmission for imparting tractive power to the front and rear driving wheels 19 and 20.

The upper and lower wheel plates 22 and 23 of both axles are provided with pivot pins 34 and 35, respectively, see Fig. 3. The pivot pins 34 are seated and adapted to have rotative movement in an opening 36 in a brace 37 which extends to opposite sides of the machine and secured to the beams 1, by being bolted or otherwise suitably secured thereto. The pivot pins 35 are seated and adapted to have rotative movement in an opening 38 in a brace 39, provided with a plurality of diverging or radiating side arms 40 which are secured to the beams 1, by being bolted or otherwise suitably secured thereto. Said wheel plates 22 and 23 also serve as the means of supporting the entire frame work and mechanism of the vehicle, since the frame is hung by the braces 37 which have been described as pivotally supported on said wheel plates.

41 designates a gear wheel interposed between the gear wheels 30 and 32 and adapted to mesh with said gear wheels, and having a concave toothed periphery 42, for purposes to be more fully described. Said gear wheel 42 is carried between the beams 1 on a shaft 43, disposed transversely of the beams 1 and journaled in boxings 44 supported from the lower sides of beams 1.

45 designates a transverse shaft journaled in bearings 46 mounted on the upper sides of beams 1. The location of shaft 45 is somewhat above the beams 1, also above the gear wheel 41, see Fig. 1. On the shaft 45 are carried oppositely disposed bevel gear wheels 47 and 48 and between said bevel gear wheels 47 and 48 on the shaft 45 is carried a gear wheel 49, adapted to mesh with the gear wheel 41. The gear wheel 49 has attached thereto or formed integral therewith plates 50, see Fig. 1, whereby the gear wheel 49 may be secured or affixed to the gear wheels 47 and 48, as at 51, see Fig. 1. Power is transmitted alternately through the gear wheels 47 and 48 to the gear wheel 49, thence to the gear wheel 41 and from thence to the gear wheels 30 and 32 for driving the traction or driving wheels 19 and 20 in a forward or backward direction. To operate the wheels 47 and 48 a bevel pinion 52 is secured on the end of shaft extension 13 and said pinion 52 is arranged to be thrown into mesh with either of the wheels 47 or 48 by a bell-crank lever 53 fulcrumed to the frame at 54. To one end of the crank 53 is attached a rod 55 operatively connected to the shaft extension 13 and to the opposite end of the crank 53 is attached a rod 56 operatively connected to an operator's lever 57, which may be arranged to be locked, after throwing the pinion 52 into mesh with either of the gears 47 and 48, in any suitable and convenient manner.

The forward and rear axles of the tractor are designed to be oscillated on the pivot pins 34 and 35, see Fig. 3, and in turning will cause the gear wheels 30 and 32 to be correspondingly oscillated, which necessitates constructing the toothed portions of the wheels 30 and 32 and the wheel 41 so that the tooth engaging portions of the respective gears may have a sliding relation with each other, while at the same time they will remain in driving contact for imparting power from the engine through the train of gearing to said front and rear axles, and this is accomplished in the manner shown, although various other ways may be employed for accomplishing the same result. To oscillate or turn the axles 21 on their pivot pins 34 and 35 toothed members 58 are attached to the upper wheel plates 22 and meshing with said members 58 are worms 59 carried by a longitudinally disposed shaft 60. Only one of the worms 59 is shown, see Fig. 2, and it is intended that said worms shall be opposites; that is to say, the forward worm will operate the member 58 to oscillate the front axle in one direction, while at the same time the rear worm will operate its member 58 to oscillate the rear axle in just the opposite direction, which will cause the traction-wheels 19 and 20 to track in turning. The shaft 60, as shown in Figs. 1 and 2 extends for part of its length along the outside of one of the beams 1 and for a part of its length along the inside of said beam. This is occasioned owing to the peculiar shape of said beams. To operate the shaft 60, a bevel gear wheel 61 is secured thereto, Fig. 1, and meshing with said gear 61 is a bevel gear wheel 62 carried by a shaft 63 which may be actuated by an operator's hand wheel 64. The wheel 64 and levers 57 and 18 are arranged in proximity to each other and the engine 7 to be within easy reach of an operator.

For the purpose of providing for the extra travel of the outside wheels in turning, each of the driving wheels 19 and 20 is provided with a ratchet connection with the axle, shown as 65, but which may be of any well known construction now in common use for such purposes.

66 denotes a guard extending longitudinally beneath the frame of the tractor and suspended from the brackets 23, said guard supporting thereon the fender 67 for the gear 41 which fender may also serve as an oil container for said gear.

Having thus fully described my invention, what I claim and desire to secure by Letters Patent of the United States, is,—

1. In a tractor, a frame, composed of spaced longitudinal beams having oppositely bent portions adjacent wheel carrying points, conforming substantially to the angles at which the wheels are turned, axles located near the opposite ends of the beams, driving wheels on the ends of the axles, wheel plates carried by the said axles, connections between the beams with which the wheel plates have a pivotal relation, and a common driving means for each axle.

2. In a tractor, a frame, front and rear oscillatory axles, a gear wheel on each axle, a driving gear wheel in mesh with the gear wheels on the axles, a pair of bevel gear wheels adapted to alternately impart power to said driving wheel, a power wheel adapted to be thrown into operative relation with either of said bevel gear wheels, and means for controlling said power wheel.

3. In a tractor, a frame, front and rear oscillatory axles, a gear wheel on each axle, a driving gear wheel in mesh with said gear wheels, a pinion in mesh with said driving wheel, a pair of oppositely disposed bevel gear wheels connected to operate in unison with said pinion, and means for alternately operating said bevel gear wheels, for the purpose of driving said driving wheel in reverse directions.

4. In a tractor, a frame, front and rear oscillatory axles, a gear wheel on each axle, a driving gear wheel in mesh with said gear wheels, a pinion in mesh with said driving wheel, a pair of oppositely disposed bevel gear wheels connected to operate in unison with said pinion, a power shaft capable of being oscillated so as to move one end from side to side, and a bevel pinion on the swingable end of said shaft, said pinion adapted to be alternately thrown into mesh with either of said bevel gear wheels.

5. In a tractor, a frame, front and rear pivoted axles, a gear wheel on each axle, said wheels having convex toothed peripheries, an interposed driving gear wheel in mesh with said gear wheels, said driving gear having a concave toothed periphery, reversible gearing for operating said driving gear wheel in opposite directions, and power devices for turning the axles.

6. In a tractor, a frame, front and rear pivoted axles, a gear wheel on each axle having a convex toothed periphery, an interposed driving gear wheel in mesh with both of said gear wheels and having a concave toothed periphery, a smaller gear wheel in mesh with said driving gear wheel and having a convex toothed periphery, bevel gear wheels in operative connection with said smaller convex gear wheel, and means for driving either one of said bevel gear wheels to propel the tractor either forward or backward.

7. In a tractor, in combination, a frame, front and rear axles, upper and lower wheel plates carried on said axles, wheels on the outer extremity of said axles, gear wheels disposed between said upper and lower wheel plates on each axle, said gear wheels having a convex toothed periphery, said upper and lower wheel plates being provided with pivot pins, a brace or supporting member secured to said frame and having openings to receive said pivot pins, a shaft mounted in said frame between said axles and having a gear wheel mounted thereon meshing with said first mentioned gear wheels, said second mentioned gear wheel having a concave toothed periphery, and means for driving said second mentioned gear wheel in either direction.

8. In a tractor, in combination, a frame, axles disposed at opposite ends of said frame, wheels on said axles, upper and lower wheel plates mounted on each axle and shaped so as to receive a gear wheel therebetween, a gear wheel on each axle mounted between the wheel plates, said gear wheel having a convex toothed periphery, said upper and lower wheel plates each being provided with pivot pins, brace or supporting members extending from said frame above and below said wheel plates and having openings formed therein to receive said pivot pins, a shaft mounted on said frame between said axles, a gear wheel mounted on said shaft and having a concave toothed periphery to mesh with both of said first mentioned gear wheels, a second shaft disposed above said first mentioned shaft and having mounted thereon oppositely disposed and spaced gear wheels, either of which is adapted to be driven from a suitable source of power, and a smaller gear wheel mounted on said second shaft between said spaced gear wheels and having a convex toothed periphery meshing with the concave toothed periphery of said second mentioned gear wheel.

In testimony whereof I affix my signature, in presence of two witnesses.

EDMOND BELLEMARE.

Witnesses:
ROBERT PLOWE,
CHAS. N. LA PORTE.